US009348519B1

(12) United States Patent
Gupta et al.

(10) Patent No.: US 9,348,519 B1
(45) Date of Patent: May 24, 2016

(54) SYSTEM AND METHODS FOR OPTIMIZING MULTIPLE DATA STREAMS THROUGHPUT TO MAXIMIZE OVERALL THROUGHPUT OF A BACKUP APPLICATION

(71) Applicants: Rajendra Kumar Gupta, Bangalore (IN); Anupam Sharma, Bangalore (IN)

(72) Inventors: Rajendra Kumar Gupta, Bangalore (IN); Anupam Sharma, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 328 days.

(21) Appl. No.: 13/803,377

(22) Filed: Mar. 14, 2013

(51) Int. Cl.
G06F 12/00 (2006.01)
G06F 3/06 (2006.01)
G06F 11/14 (2006.01)

(52) U.S. Cl.
CPC .......... *G06F 3/0613* (2013.01); *G06F 11/1456* (2013.01); *G06F 2213/0064* (2013.01)

(58) Field of Classification Search
CPC ................. G06F 11/1456; G06F 2213/0064
See application file for complete search history.

(56) References Cited

U.S. PATENT DOCUMENTS

| 8,244,998 | B1* | 8/2012 | Krinke, II | 711/162 |
| 8,504,785 | B1* | 8/2013 | Clifford et al. | 711/162 |
| 2011/0082972 | A1* | 4/2011 | Cherkasova et al. | 711/111 |
| 2012/0117028 | A1* | 5/2012 | Gold et al. | 707/640 |

* cited by examiner

Primary Examiner — Charles Rones
Assistant Examiner — Tian-Pong Chang
(74) Attorney, Agent, or Firm — Polsinelli PC

(57) ABSTRACT

A system and method for controlling a backup of a plurality of computing devices to a distinct storage is provided. The method comprises: determining, based at least on a write speed parameter and backup data parameter of each computing device, whether a throughput and/or a speed of a backup of computer devices can be improved; calculating, in response to a positive result of the determining, new write speeds for the individual computing devices; and sending the new write speeds to at least the corresponding ones of the computing devices. The new write speeds of individual ones of the plurality of computers are balanced such that each computing device completes backup at substantially the same time.

11 Claims, 7 Drawing Sheets

SYSTEM AND METHODS FOR OPTIMIZING MULTIPLE DATA STREAMS THROUGHPUT TO MAXIMIZE OVERALL THROUGHPUT OF A BACKUP APPLICATION

FIELD OF THE INVENTION

The various embodiments described herein relate generally to backing up and/or copying data on computing devices. More specifically, the present invention relates to methodologies for optimizing the speed at which a system can backup data from its computers.

BACKGROUND

In a data backup environment, several client devices can commence data backup at the same time using common write speeds (capacity to transfer data to the backup device). However, the amount of data to be backed up can be different for each client. Given the common write speed, the different amounts of data to backup can lead to a slower overall performance. This is because the client machines commence the backup process at the same time but complete the backup process at different times based upon the amount of data to backup.

The time required to complete the backup process tends to be driven by the client machine with the largest amount of data, and specifically that amount of data divided by the write speed of the corresponding client machine. The back up process is unable to leverage the bandwidth allocated to the other client machines, with less data to backup, that complete their backup process earlier.

BRIEF DESCRIPTION OF THE DRAWINGS

Various embodiments in accordance with the present disclosure will be described with reference to the drawings, in which.

DETAILED DESCRIPTION

It is to be understood that the figures and descriptions of embodiments of the present invention have been simplified to illustrate elements/steps relevant for a clear understanding of the present invention, while eliminating, for the purpose of clarity, other elements/steps found or used in typical presentations, productions, data delivery, computing systems, devices and processes. Those of ordinary skill in the art may recognize that other elements and/or steps are desirable and/ or required in implementing the example embodiments of the present invention. However, because such elements and steps are well known in the art, and do not facilitate a better understanding of the present invention, a discussion of such elements/steps is not provided herein.

Figure 1:
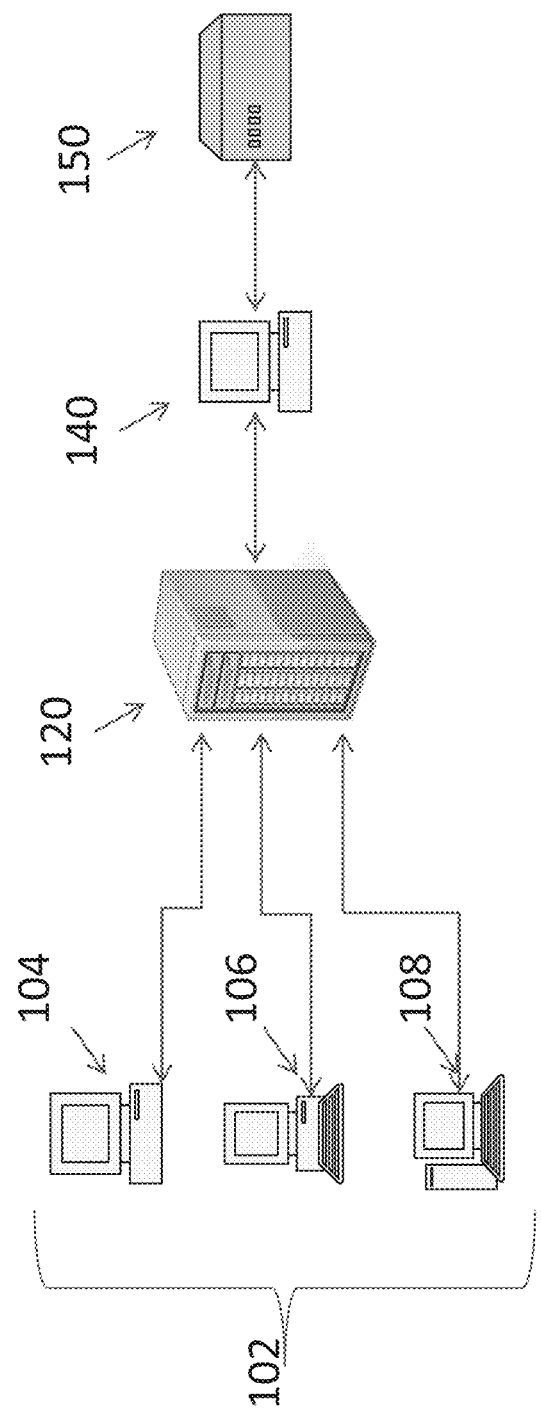
FIG. 1 is an example schematic of an environment for executing a backup methodology according to an example embodiment of the invention.

Referring now to FIG. 1, a methodology is described with respect to a group 102 of client machines 104, 106 and 108. Each client machine 104, 106 and 108 is scheduled to run the backup process at the same time, and using a specific common write speed. The data transmitted during the backup process can pass through server 120 and storage node 140 for ultimate storage in storage device 150. The various underlying components and connections are known in the art, and not discussed further herein.

Each client machine can have a different amount of data to backup. For example, client machine 104 can have 10 GB of data to backup, client machine 106 can have 30 GB of data to backup, and client machine 108 can have 65 GB of data to backup. The common write speed of the backup process in this example embodiment for each client machine is 2 GB/sec.

Figure 2:
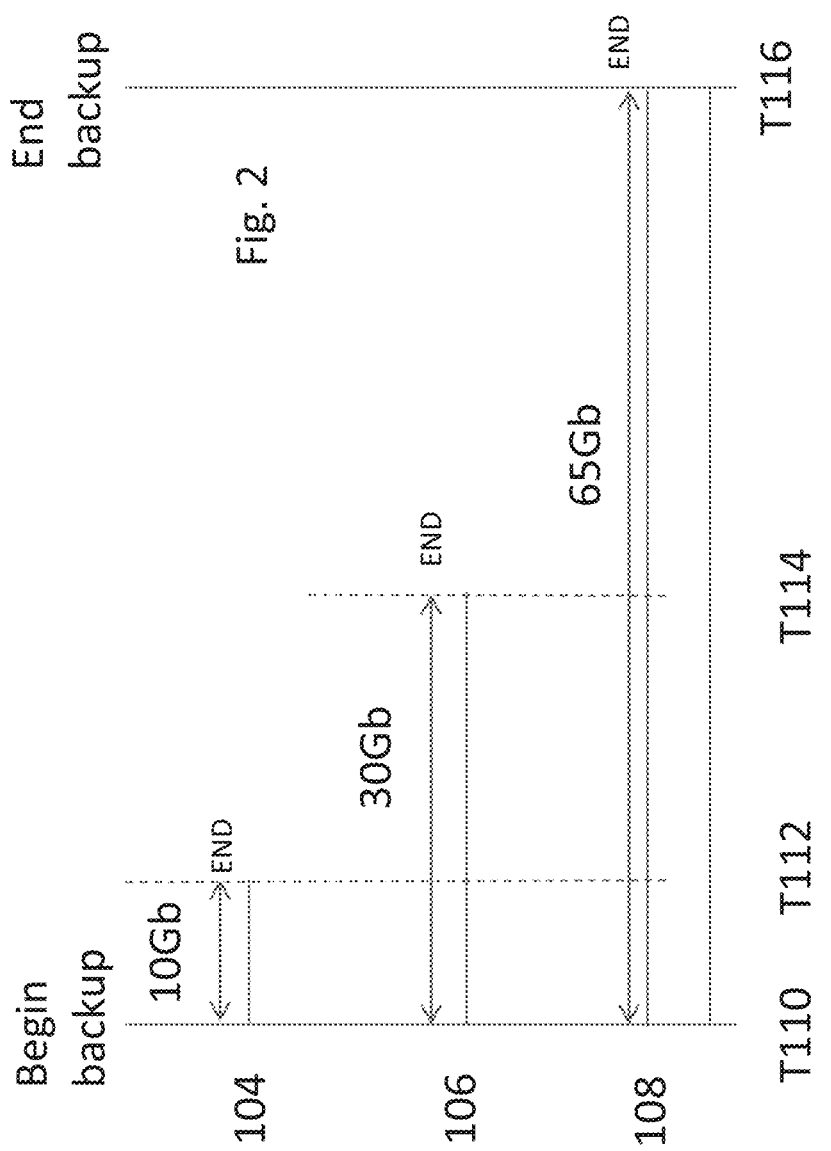
FIG. 2 is an graph representing example backup methodology of data using common write speeds.

FIG. 2 shows a graph of the above example backup methodology. At time T110, each client machine 104, 106 and 108 begins near simultaneous transmission of the backup data. The transmission continues until time T112, at which point client machine 104 will have completed transmission of the 10 GB and discontinues further transmission; at time T112, each of the client machines 104, 106 and 108 have transmitted 10 GB. Client machines 106 and 108 continue with their transmission through time T114, at which point client machine 106 will have completed transmission of its 30 GB and discontinues further transmission; at time T114 each of the client machines 106 and 108 have uploaded 30 GB. Client machine 108 continues with transmission through time T116, at which point client machine 106 will have completed transmission of its 65 GB and discontinues further transmission. All data is now backed up, and the backup process completes.

The time required to complete the backup process is driven by the client machine with the largest amount of data, in this case client 108. The backup time from T110 to T116 is the amount of data transferred by client machine 108 divided by the write speed of client machine 108. In the example of FIG. 1, 65 GB was written at 2 GB/sec, such that the entire backup process for the entire group 102 was 32.5 sec. The methodology is unable to leverage the earlier completion of downloads for client machines 104 and 106, such that the corresponding bandwidth allocated for these client machines remains unused. The corresponding throughput is quite low, at approximately 3.2 GB/sec relative to the collective 6 GB/sec (3 machines at 2 GB/sec each write speed) that was available.

Figure 3:
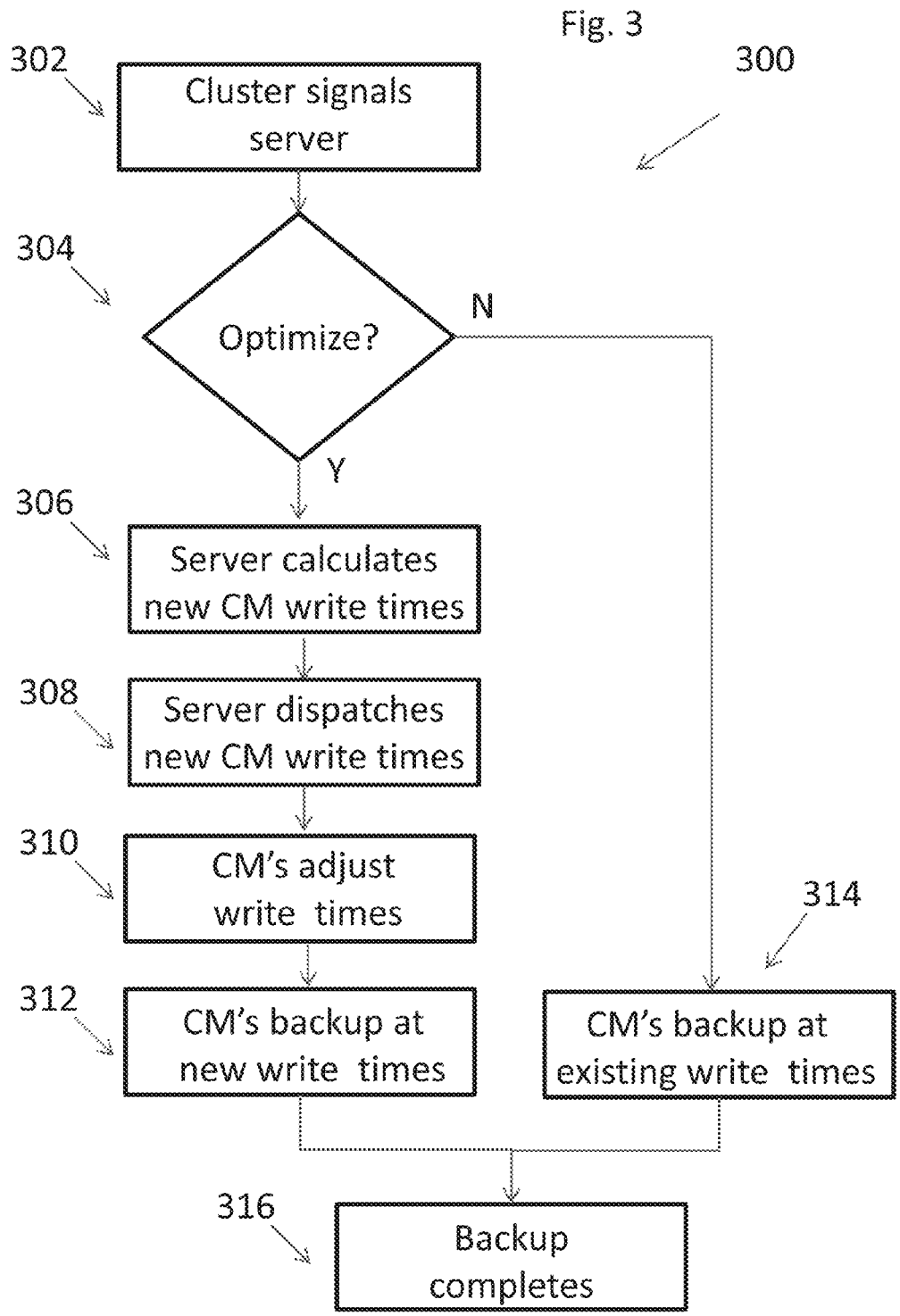
FIG. 3 is a flowchart representing an example methodology of an example embodiment of the invention.

Referring now to FIG. 3, a flowchart detailing the methodology of an example embodiment of the invention is shown generally at 300. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

At step 302, the group 102 of client machines sends an appropriate signal(s) to server 120 consistent with commencement of the backup process. The signal may itself be the actual commencement of the backup process, or some predicator of any intent to being the backup process.

Preferably the signal includes the write speed of the underlying client machines of group 102 and the amount of data on each machine to backup. The amount of data may be from one or more savesets on each machine, such as from different drives on the client machine. A saveset is a collection of data the client machines will process for backup. (For purposes of the instant methodology, the source and nature of the data on a particular client machine are not particularly relevant, if the total amount of data to backup for that client machine is known.) In the alternative, some or all of the foregoing data in the signal may already be resident on server 120 or otherwise available from another source.

At step 304, server 120 analyzes the write speeds of the client machines within group 102 and the corresponding amount of data that each client machine has to backup. The analysis will determine whether the backup time could be improved by changing the write speed of the individual client machines within group 102. This step is generally referred to as an optimization step, although it is to be understood that optimization includes any improvement, regardless of whether it is the best improvement that can be obtained under the system conditions.

If the backup time cannot be improved, or cannot be improved by a sufficient predetermined amount or percentage, then control passes to step 314, where the backup process engages using the preexisting write speeds of the individual client machines within group 102. The backup process concludes at step 316.

If the backup time can be improved, or at least improved by a sufficient predetermined amount or percentage, then control passes to step 306. At step 306, server 120 calculates new write speeds for the individual client machines within group 102. At step 308, server 120 transmits the new write speeds to group 102; the transmission step may include sending each client machine its new write speed, or selectively transmitting each write speed to all or any specific machines in group 102. At step 310, the individual client machines adjust their write speeds as instructed. At step 312, the group 102 of client machines commences the backup with the new write speeds. The backup process concludes at step 316.

Figure 4:
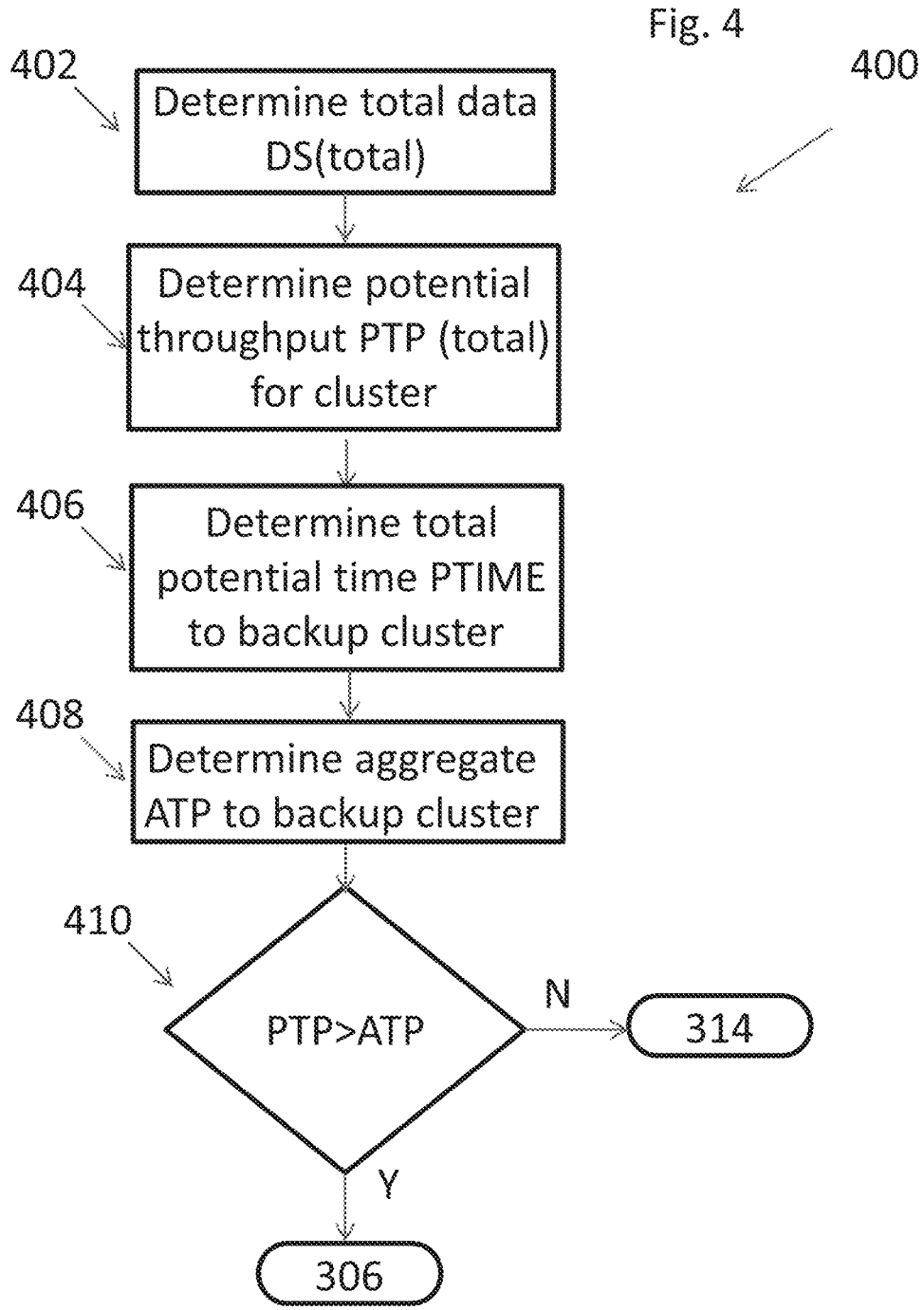
FIG. 4 is a flowchart representing an example method of determining whether optimization is appropriate.

Referring now to FIG. 4, an example embodiment of a flowchart 400 describes a manner in which server 120 determines whether optimization is appropriate at step 302 is shown. At step 402, server 120 determines the total amount of data to backup from individual client machines in group 102. For N machines, this may be represented as follows:

$$DS(Total)=DS1+DS2+\ldots+DSN$$

Where:
DS (Total) is the total data to be backed up;
DSi is the "data to be sent" by each client machine i, in ascending order based on the size of the data to backup.

The concept of "in ascending order" for the above equation is effectively a convenience to define DSi for subsequent equations. Thus, if there are two machines with backups of 10 GB and 20 GB, respectively, then DS1=10 GBs and DS2=20 GBs. Since the equation is simple addition, the actual order of addition is irrelevant.

At step 404, server 120 determines the total potential throughput (PTP) based on the existing write speed of the individual client machines within group 102. For N machines, this may be represented as follows:

$$PTP(total)=TP1+TP2+\ldots+TPN$$

Where:
TPi is the write speed throughput of each client machine i, in ascending order based on the size of the data to backup; and
PTP is the potential throughput for group 102.

The concept of "in ascending order" for the above equation is effectively a convenience to define TPi for subsequent equations. Since the equation is simple addition, the actual order of addition is irrelevant.

At step 406, server 120 determines the Total Potential time (PTIME) to transfer data from group 102, which may be represented as follows:

$$PTIME=DS(total)/PTP(total)$$

At step 408, server 120 determines the actual Aggregate Throughput (ATP) relative to the entire backup process in the absence of any optimization. For j machines ordered in ascending order of the amount of data for backup, this may be represented as follows:

$$ATP=DS(total)/M$$

$$M=[((K \times (DS1-DS0))/TP(K))+(((K-1) \times (DS2-DS1))/TP(K-1))+\ldots(DS(K)-DS(K-1))/TP(1))]$$

Wherein:
K is the number of machines that are backing up;
DSj is the "data to be sent" by client machine j, in ascending order based on the size of the data to backup (note, DS0=0); and
TP(x)=total throughput of the client machines that are sending data for backup in parallel for that segment.

At step 410, server 120 compares the ATP with the PTP. If PTP>ATP, then optimization is selected and control proceeds to step 306 in FIG. 3; otherwise control proceeds to step 314 for backup using the prior write speeds. In some embodiments, PTP may need to exceed ATP by a certain percentage or amount to warrant optimization. This percentage or amount could be predetermined, or determined based on the actual system values in real time or as previously detected and stored.

The above order of steps is exemplary only. The order can be rearranged and/or executed simultaneously, subject to allowing for any equation that relies upon a value from a prior equation. Thus, the determination of DS(total) need not precede the determination of PTP(total), but generally precedes the PTIME calculation because PTIME is based on DS(total).

Returning to FIG. 3, at step 306 server 120 calculates the Optimized Throughput OTP for the individual client machines. For each machine, this may be represented as follows:

$$OTPi=DSi/PTIME$$

$$\text{Or } OTPi=DSi \times PTP(total)/DS(total)$$

Wherein:
OPTi is the optimized write speed for the ith client machine; and
DSi is the amount of data to be backed up on the ith client machine.

Application of the above formula changes the throughput of each individual client machine so that every client machine finishes the backup at substantially the same time. This results in faster backup times and optimized throughput.

The results of step 306 can alter at least some of the write speed times of the individual client machines. Machines with less data to backup can tend to see their write times slowed. Machines with more data to backup can tend to see their write times increased.

It is possible that the calculation at step 306 results in a value that exceeds the write speed of a particular client machine. In such a case, the overage can essentially be ignored. This could be done at the calculation level 306 or at some downstream step, in that the calculated value could simply be reduced to the physical maximum write speed. In some embodiments, the client machine could lower the value, or simply ignore it and proceed with its physical maximum. The result would not be an idealized optimization, but would nonetheless represent an improvement over the un-optimized process.

It is also possible that the calculated new write speed for any particular client machine can, by coincidence, be the same as the prior write speed. In this case, the response at step 308 can (a) send the newly calculated write speed to the client machine to adopt, (b) send a signal to the client machine to maintain its current write speed, and/or (c) take no action for that client machine.

Below follows non-limiting examples of application of the above embodiments.

In the example discussed with respect to FIGS. 1-2, client machine 104 has 10 GB of data to backup, client machine 106 as 30 GB of data to backup, and client machine 108 has 65 GB of data to backup. The common write speed of backup for each client machine is 2 GB/sec. Per the steps described herein to determine optimization in FIG. 4:

DS(total)=10+30+65=105 GB

PTP(total)=2+2+2=6 GB/s $P$TIME=105/6=17.5s

ATP=105/[(3×(10−0))/3+(2×(30−10))/2+(65−30)/1]=105/65=1.61 GB/s

Since PTP>ATP, optimization can improve the throughput and transmission time of the backup process. Applying the optimization methodology at step 306, the throughput speeds are changed as follows:

OTP$_{104}$=10/17.5=0.6 GB/s

OPT$_{106}$=30/17.5=1.7 GB/s

OPT$_{108}$=65/17.5=3.7 GB/s

Figure 5:
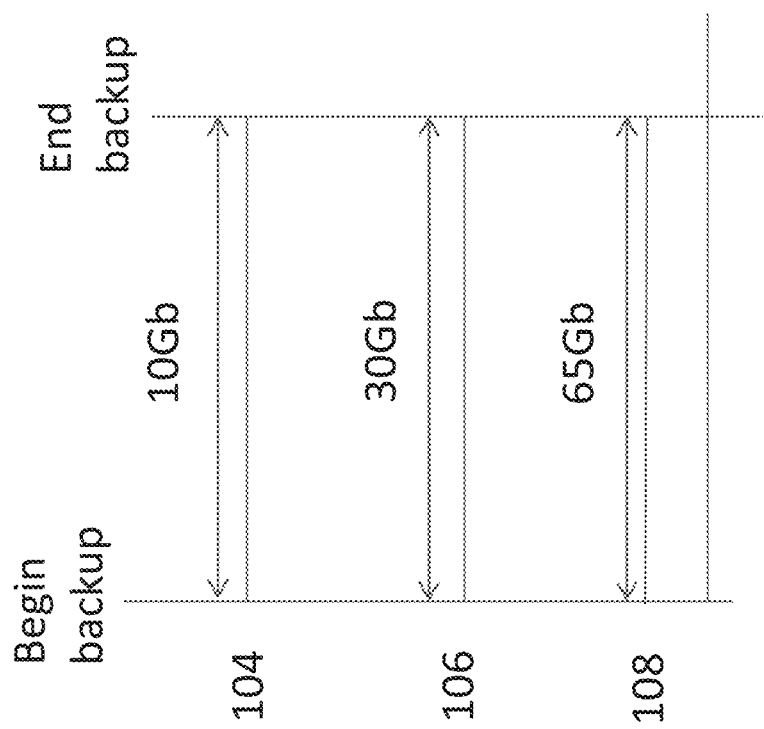
FIG. 5 is a graphic result of an example embodiment using the example optimization method in FIG. 4.

The above optimized write speeds can in some cases increase and in some cases decrease the prior write speed of a client machine. However, the overall time for the download reduces from 32.5 s to 17.5 s, and the throughput for the group 102 increases from 1.2 GB/s to 6 GBs. The graphic result is shown in FIG. 5 as graph 500.

Figure 6:
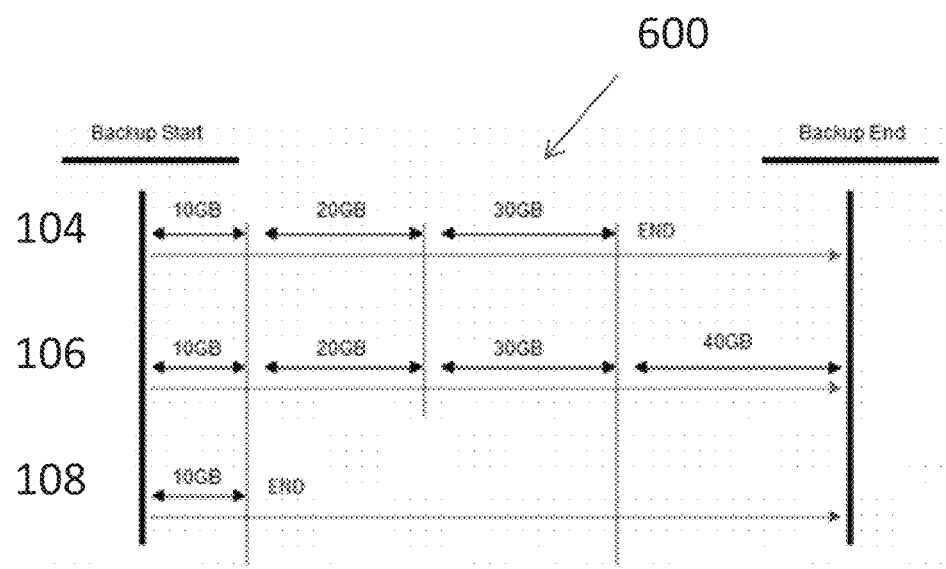
FIG. 6 is a graphic result of an example embodiment not using the example optimization method in FIG. 4.
Figure 7:
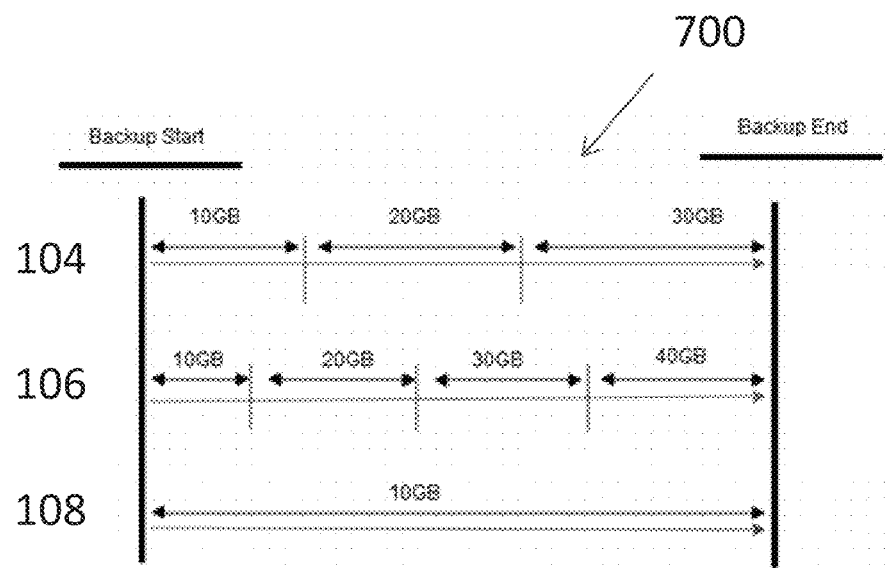
FIG. 7 is a graphic result of an example embodiment using the example optimization method in FIG. 4.

Referring now to FIGS. 6 and 7, consider another example of client machines 104, 106 and 108, each having a backup write speed of 50 mb/s. Client machine 104 has 60 GB to backup, client machine 106 has 100 GB to backup, and client machine 108 has 10 GB to backup. Using the 50 MB write speed as is, graph 600 of FIG. 6 shows a the process will take some 2000 seconds to backup, with an overall throughout of 83 MB/s.

Applying the optimization methodology herein to those parameters, the results are shown in graph 700 in FIG. 7:

DS(total)=10+60+100=170 GB=174080 MB

PTP(total)=50+50+50=150 MB/s $P$TIME=174080/150=1161s

ATP=174080/[(3*(10240−0))/150+(2*(61440−10240))/100+(102400−61440)/50]=174080/=85 MB/s

As shown above PTP>ATP. Optimization can improve the throughput and transmission time of the backup process. Applying the optimization methodology at step 306, the throughput speeds are changed as follows:

OPT$_{104}$=61440/1160.53=52.94 MB/s

OPT$_{106}$=102400/1160.53=88.24 MB/s

OTP$_{108}$=10240/1160.53=8.82 MB/s

The backup now completes in 1161 s (PTIME), and the throughput increases to the full PTP.

In the above example, as shown in FIG. 6 client machine 106 has 60 GBs to backup based on segments of 10, 20 and 30 GBs. This illustrates that the total amount of data to be backup may not be a uniform file, but may originate from several files or sources, such as different drives on a client machine.

Consider yet another example for which several client machines have the same amount of data to backup. For example, client machine 104 has 10 GB, client machine 106 has 10 GB, and client machine 108 has 20 GB; each machine has a 10 GB/s write speed. Applying the optimization methodology herein to those parameters:

DS(total)=10+10+20=40 GB

PTP(total)=10+10+10=30GB/s $P$TIME=40/30=1.3s

ATP=40/[(3*(10−0))/30+(2*(10−10))/20+(20−10)/10]=40/3=13.3 GB/s

Again, PTP>ATP, such that optimization can improve the throughput and transmission time of the backup process. Applying the optimization methodology at step 306, the throughput speeds are changed as follows:

OTP$_{104}$=10 G/1.3 s=7.7 GB/s

OPT$_{106}$=10 G/1.3 s=7.7 GB/s

OPT$_{108}$=20 G/1.3 s=14.6 GB/s

The backup now completes in 1.3 s (PTIME), and the throughput increases to the full PTP.

The various steps of the above embodiments above are discussed as being performed in server 120. However, the invention is not so limited. Any computing device, or combinations of devices, that can access the underlying system parameters in group 102 can perform the noted steps. For example, the client machines could themselves perform some or all of the steps. In another example, a separate system could analyze the computing machines and send revised write speeds that are saved for later reference and use. In yet another example, virtualized environment could be used.

In some embodiments of the invention, step 304 can be omitted, in that the system will run through the optimization steps regardless of whether it results in any improvement.

In some embodiments, the original write speeds of group 102 are substantially the same. However, the invention is not so limited, and different write speeds could be present, although this may alter some of the optimization detection and calculation equations.

Figure 8:
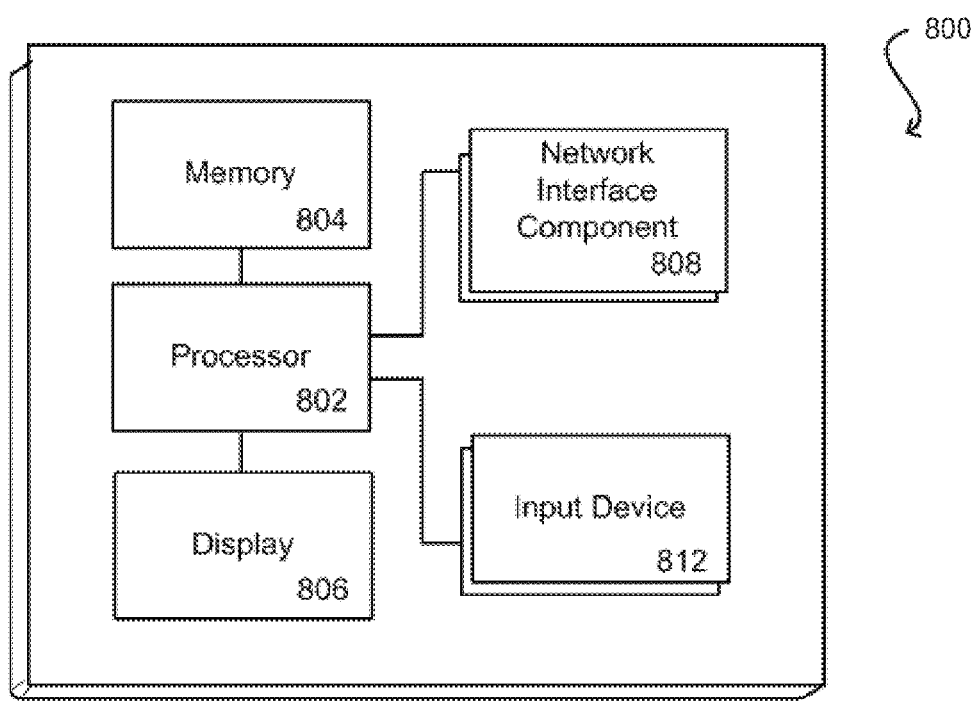
FIG. 8 is a block diagram of a computing environment in which example embodiments of the invention may be incorporated.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 812 able to receive conventional input from a user. This conventional input can include, for example, a push button, touch pad, touch screen, keyboard, mouse, keypad, or any other such device or element whereby a user can input a command to the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices that can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

It will be apparent to those skilled in the art that modifications and variations may be made in the systems and methods of the present invention without departing from the spirit or scope of the invention. It is intended that the present invention cover the modifications and variations of this invention provided they come within the scope of the appended claims and their equivalents.

What is claimed:

1. A computer-implemented method for controlling backup of a plurality of computing devices to a distinct storage, comprising:
   determining, based at least on a write speed parameter and backup data parameter of each computing device, whether a throughput and/or a speed of a backup of the computing devices to the distinct storage can be improved, wherein the write speed parameter of said each computing device specifies a write speed of said each computing device writing data to be backed up from said each computing device to the distinct storage, the backup data parameter of said each computing device specifies an amount of data to be backed up from said each computing device to the distinct storage, and the computing devices have different amounts of data to be backed up to the distinct storage;
   calculating, in response to a positive result of the determining, new write speeds for the individual computing devices; and
   sending the new write speeds to at least the corresponding ones of the computing devices;
   wherein the new write speeds for the individual computing devices are balanced such that each individual one of the computing devices could complete backup to the distinct storage at substantially the same time; and
   wherein the determining comprises:
   determining a total potential throughput (PTP) based on the existing write speed of the "N" computing devices according to:

PTP (total)=$TP_1+TP_2+\ldots+TP_N$; where $TP_i$ is the write speed throughput of each computing device "i", in ascending order based on the size of the data to backup; and
   determining an Aggregate Throughput (ATP) relative to the entire backup process in the absence of any optimization according to:

DS(total)=$DS_1+DS_2+\ldots+DS_N$;

$M=[((K\times(DS_1-DS_0))/TP(K))+(((K-1)\times(DS_2-DS_1))/TP(K-1))+\ldots(DS(K)-DS(K-1))/TP(1))]$; and ATP=DS(total)/$M$:

wherein K is the number of the computing devices that are backing up;
   $DS_j$ is the "data to be sent" from the computing device "j", in ascending order based on the size of the data to backup, and $DS_0$=0; and
   TP(x)=total throughput of the computing devices that are sending data for backup in parallel for the segment "x"; and
   comparing the PTP to the ATP to determine a positive result when the PTP is greater than the ATP.

2. The computer-implemented method of claim 1, wherein the calculating comprises applying the formula:

DS(j)×PTP(total)/DS(total)

Wherein:
   DS(j) is the amount of data to be backed up on the jth client machine;
   DS(total) is the amount of data to be backed up on all of the plurality of computing devices; and
   PTP(total) is the total of the existing write speeds of all of the plurality of computing devices.

3. The computer-implemented method of claim 1, wherein the sending comprises:
   when the new write speed for any one of the computing devices is different from a current write speed for said any one of the computing devices, sending the new write speed to said any one of the computing devices; and
   when the new write speed for said any one of the computing devices is the same as the current write speed for said any one of the computing devices, either:
      sending the new write speed to said any one of the computing devices;
      sending a signal to said any one of the computing devices indicating the write speed for said any one of the computing devices is unchanged; or
      sending no notification regarding the new write speed.

4. The computer-implemented method of claim 1, wherein when the new write speed exceeds a maximum write speed of a particular computing device, the method further comprises modifying the new write speed to the maximum write speed.

5. A computing system for controlling backup of a plurality of computing devices to a distinct storage, said computing system comprising:
   at least one processor; and
   a memory including instructions that, when executed by the at least one processor, cause the computing system to:
      determine, based at least on a write speed parameter and backup data parameter of each computing device, whether a throughput and/or a speed of a backup of the computing devices to the distinct storage can be improved, wherein the write speed parameter of said each computing device specifies a write speed of said each computing device writing data to be backed up from said each computing device to the distinct storage, the backup data parameter of said each computing device specifies an amount of data to be backed up from said each computing device to the distinct storage, and the computing devices have different amounts of data to be backed up to the distinct storage;
      calculate, in response to a positive result of the determining, new write speeds for the individual computing devices; and
      send the new write speeds to at least the corresponding ones of the computing devices;
      wherein the new write speeds for the individual computing devices are balanced such that each individual one of the computing devices could complete backup to the distinct storage at substantially the same time; and
      wherein the instructions that cause the computing system to determine cause the computing system to:
      determine a total potential throughput (PTP) based on the existing write speed of the "N" computing devices according to:

PTP (total)=TP1+TP2+ . . . +TPN; where TPi is the write speed throughput of each computing device "i", in ascending order based on the size of the data to backup; and determine an Aggregate Throughput (ATP) relative to the entire backup process in the absence of any optimization according to:

$$DS(total)=DS1+DS2+ \ldots +DSN;$$

$$M=[((K \times (DS1-DS0))/TP(K))+(((K-1) \times (DS2-DS1))/TP(K-1))+ \ldots (DS(K)-DS(K-1))/TP(1))];\ \text{and}$$

$$ATP=DS(total)/M;$$

wherein K is the number of the computing devices that are backing up;

DSj is the "data to be sent" from the computing device "j", in ascending order based on the size of the data to backup, and DS0=0; and TP(x)=total throughput of the computing devices that are sending data for backup in parallel for the segment "x"; and compare the PTP to the ATP to determine a positive result when the PTP is greater than the ATP.

6. The computing system of claim 5, wherein the instructions that cause the computing system to calculate comprises applying the formula:

$$DS(j) \times PTP(total)/DS(total)$$

Wherein:

DS(j) is the amount of data to be backed up on the jth client machine;

DS(total) is the amount of data to be backed up on all of the plurality of computing devices; and PTP(total) is the total of the existing write speeds of all of the plurality of computing devices.

7. The computer system of claim 5, wherein the instructions that cause the computing system to send comprises:

when the new write speed for any one of the computing devices is different from a current write speed for said any one of the computing devices, sending the new write speed to said any one of the computing devices; and when the new write speed for said any one of the computing devices is the same as the current write speed for said any one of the computing devices, either:

sending the new write speed to said any one of the computing devices;

sending a signal to said any one of the computing devices indicating the write speed for said any one of the computing devices is unchanged; or sending no notification regarding the new write speed.

8. The computer system of claim 5, wherein when the new write speed exceeds a maximum write speed of a particular computing device, the instructions further comprises instructions to modify the new write speed to the maximum write speed.

9. A non-transitory computer readable storage medium comprising one or more sequences of instructions for controlling backup of a plurality of computing devices to a distinct storage, the instructions being configured to be executed by one or more processors to cause the one or more processors to:

determining, based at least on a write speed parameter and backup data parameter of each computing device, whether a throughput and/or a speed of a backup of the computing devices to the distinct storage can be improved, wherein the write speed parameter of said each computing device specifies a write speed of said each computing device writing data to be backed up from said each computing device to the distinct storage, the backup data parameter of said each computing device specifies an amount of data to be backed up from said each computing device to the distinct storage, and the computing devices have different amounts of data to be backed up to the distinct storage;

calculating, in response to a positive result of the determining, new write speeds for the individual computing devices; and sending the new write speeds to at least the corresponding ones of the computing devices;

wherein the new write speeds are balanced such that each individual one of the computing devices could complete backup to the distinct storage at substantially the same time; and wherein the determining comprises:

determining a total potential throughput (PTP) based on the existing write speed of the "N" computing devices according to:

PTP (total)=TP1+TP2+ . . . +TPN; where TPi is the write speed throughput of each computing device "i", in ascending order based on the size of the data to backup; and determining an Aggregate Throughput (ATP) relative to the entire backup process in the absence of any optimization according to:

$$DS(total)=DS1+DS2+ \ldots +DSN:$$

$$M=[((K \times (DS1-DS0))/TP(K))+(((K-1) \times (DS2-DS1))/TP(K-1))+ \ldots (DS(K)-DS(K-1))/TP(1))];\ \text{and}$$

$$ATP=DS(total)/M;$$

wherein K is the number of the computing devices that are backing up;

DSj is the "data to be sent" from the computing device "j", in ascending order based on the size of the data to backup, and DS0=0; and TP(x)=total throughput of the computing devices that are sending data for backup in parallel for the segment "x"; and comparing the PTP to the ATP to determine a positive result when the PTP is greater than the ATP.

10. The non-transitory computer readable storage medium of claim 9, wherein the instructions for calculating comprises instructions for applying the formula:

$$DS(j) \times PTP(total)/DS(total)$$

Wherein:

DS(j) is the amount of data to be backed up on the jth client machine;

DS(total) is the amount of data to be backed up on all of the plurality of computing devices; and PTP(total) is the total of the existing write speeds of all of the plurality of computing devices.

11. The non-transitory computer readable storage medium of claim 9, wherein the instructions for sending comprises:

when the new write speed for any one of the computing devices is different from a current write speed for said any one of the computing devices, sending the new write speed to said any one of the computing devices; and when the new write speed for said any one of the computing devices is the same as the current write speed for said any one of the computing devices, either:

sending the new write speed to said any one of the computing devices;

sending a signal to said any one of the computing devices indicating the write speed is unchanged; or sending no notification regarding the new write speed.

* * * * *